United States Patent [19]
Ishikawa et al.

[11] Patent Number: 6,132,856
[45] Date of Patent: Oct. 17, 2000

[54] SINTERED SIC FIBERS BONDED MATERIAL

[75] Inventors: Toshihiro Ishikawa; Shinji Kajii; Kenji Matsunaga; Toshihiko Hogami, all of Ube, Japan

[73] Assignee: Ube Industries, Ltd., Yamaguchi-ken, Japan

[21] Appl. No.: 09/116,764

[22] Filed: Jul. 17, 1998

[30] Foreign Application Priority Data

Jul. 22, 1997 [JP] Japan .................................... 9-210181

[51] Int. Cl.[7] .................. C04B 35/565; C04B 35/571
[52] U.S. Cl. .................. 428/292.1; 264/625; 264/640; 442/205; 442/239; 442/327; 501/88; 501/89; 501/90; 501/95.1
[58] Field of Search ...................... 501/88, 89, 90, 501/95.1, 95.2, 95.3; 264/640, 625; 428/292.1; 442/205, 239, 327

[56] References Cited

U.S. PATENT DOCUMENTS 4,942,011  7/1990  Bolt et al. ............................. 264/211
5,207,861  5/1993  Yamamura et al. ..................... 264/640

OTHER PUBLICATIONS

*Patent Abstracts of Japan*, 95(6), abstract of JP 7–069747 (Jul. 31, 1995).
*Patent Abstracts of Japan*, 97(6), abstract of JP 9–052776 (Jun. 30, 1997).

*Primary Examiner*—James Derrington
*Attorney, Agent, or Firm*—Wenderoth, Lind & Ponack, L.L.P.

[57] ABSTRACT

A highly heat-resistant sintered SiC fiber bonded material free of a decrease in strength and less breakable at an ultra-high temperature over 1,400° C., comprising inorganic fibers which are composed mainly of a sintered SiC crystal, contain at least one kind of metal atoms selected from the class consisting of metal atoms of the 2A, 3A and 3B groups of the periodic table and are bonded nearly in the close-packed structure and 1 to 50 nm boundary layers composed mainly of carbon which are present at the interface of fibers, the less breakable highly heat-resistant sintered SiC fiber-bonded material having a density of at least 2.7 g/cm$^3$ and an elastic modulus of at least 200 GPa, and a process for the production thereof.

4 Claims, 1 Drawing Sheet

SINTERED SIC FIBERS BONDED MATERIAL

FIELD OF THE INVENTION

The present invention relates to an less breakable ceramic composite material having a high elastic modulus and excellent high-temperature strength, and a process for the production thereof.

PRIOR ART AND PROBLEMS

JP-A-7-69747 discloses an inorganic fiber sintered body comprising inorganic fibers composed of atoms of Si, C, either Ti or Zr and O and an inorganic substance which is composed of atoms of Si, either Ti or Zr and O and is present so as to be filled in the interstices, the inorganic fiber sintered body having 1 to 200 nm thick amorphous and/or crystalline carbon layers which are present as boundary layers between the inorganic fibers and the inorganic substance. While the above inorganic fiber sintered body exhibits high fracture energy and excellent mechanical properties, it sometimes shows behaviors like plastic deformation at a high temperature over 1,300° C. Thereafter, JP-A-9-52776 discloses an excellent composite material which does not show any behavior like plastic deformation at a temperature of as high as 1,400° C. in an immediate fracture strength measuring test, since the behaviors like plastic deformation are inhibited by further creating a structure in which TiC or ZrC crystalline fine particles having a particle diameter of 100 nm or less are dispersed in the inorganic substance which is composed of atoms of Si, either Ti or Zr and O and is present so as to be filled in the interstices.

However, the inhibition of plastic flow on the basis of the above particles-dispersed structure has its own limit. In creep resistance in air at 1,400° C., not all the results are satisfactory, and at 1,500° C., it shows a slight decrease in strength caused by plastic deformation.

Meanwhile, aircraft jet engines are making remarkable progress recently, and it is therefore strongly demanded to increase the temperature of combustion gas and decrease the weight of materials for use. Under the circumstances, a ceramic material which has durability at an ultra-high temperature over 1,400° C. and is less breakable comes to be essential.

SUMMARY OF THE INVENTION

It is an object of the present invention to provide a highly heat-resistant sintered SiC fiber-bonded material which is free of a decrease in strength and unbreakable at an ultra-high temperature over 1,400° C. and a process for the production thereof.

According to the present invention, the above object of the present invention is achieved by an unbreakable highly heat-resistant sintered SiC fiber-bonded material comprising inorganic fibers which are composed mainly of a sintered SiC crystal, contain at least one kind of metal atoms selected from the class consisting of metal atoms of the 2A, 3A and 3B groups of the periodic table and are bonded nearly in the closest packing state and 1 to 50 nm boundary layers composed mainly of carbon which are present at the interface of each fiber, the less breakable highly heat-resistant sintered SiC fiber-bonded material having a density of at least 2.7 g/cm$^3$ and an elastic modulus of at least 200 GPa.

According to the present invention, the above object of the present invention is also achieved by a process for the production of a sintered SiC fiber-bonded material, which comprises:

a first step of adding a compound containing at least one kind of metal atoms selected from the class consisting of the 2A, 3A and 3B groups of the periodic table to a polysilane in which the molar ratio of carbon atoms to silicon atoms is at least 1.5 or a heat reaction product thereof and allowing the resultant mixture to react under heat in an inert gas atmosphere, to prepare a metal-element-containing organosilicon polymer, a second step of melt-spinning the metal-element-containing organosilicon polymer to obtain a spun fiber, a third step of curing the spun fiber under heat at 50 to 170° C. in an oxygen-containing gas atmosphere to prepare an infusible fiber, a fourth step of converting the infusible fiber to an inorganic fiber in an inert gas atmosphere, and a fifth step of preparing a preliminary shaped material from the inorganic fiber, setting the preliminary shaped material in a mold, and pressurizing the preliminary shaped material in the mold at a temperature in the range of from 1,700 to 2,200° C. in vacuum or in a gas atmosphere containing at least one selected from the group consisting of an inert gas, a reducing gas and hydrocarbon gas.

Otherwise, the above object of the present invention is also achieved by a process for the production of a sintered SiC fiber-bonded material, which comprises:

a first step of adding a compound containing at least one kind of metal atoms selected from the class consisting of the 2A, 3A and 3B groups of the periodic table to a polysilane in which the molar ratio of carbon atoms to silicon atoms is at least 1.5 or a heat reaction product thereof and allowing the resultant mixture to react under heat in an inert gas atmosphere, to prepare a metal-element-containing organosilicon polymer, a second step of melt-spinning the metal-element-containing organosilicon polymer to obtain a spun fiber, a third step of curing the spun fiber under heat at 50 to 170° C. in an oxygen-containing gas atmosphere to prepare an infusible fiber, and a fourth step of preparing a preliminary shaped material from the infusible fiber, setting the preliminary shaped material in a mold, converting the preliminary shaped material to an inorganic material in vacuum or in a gas atmosphere containing at least one selected from the group consisting of an inert gas, a reducing gas or a hydrocarbon gas, and pressurizing the inorganic material in the mold at a temperature in the range of from 1,700 to 2,200° C.

DETAILED DESCRIPTION OF THE INVENTION

Figure 1:
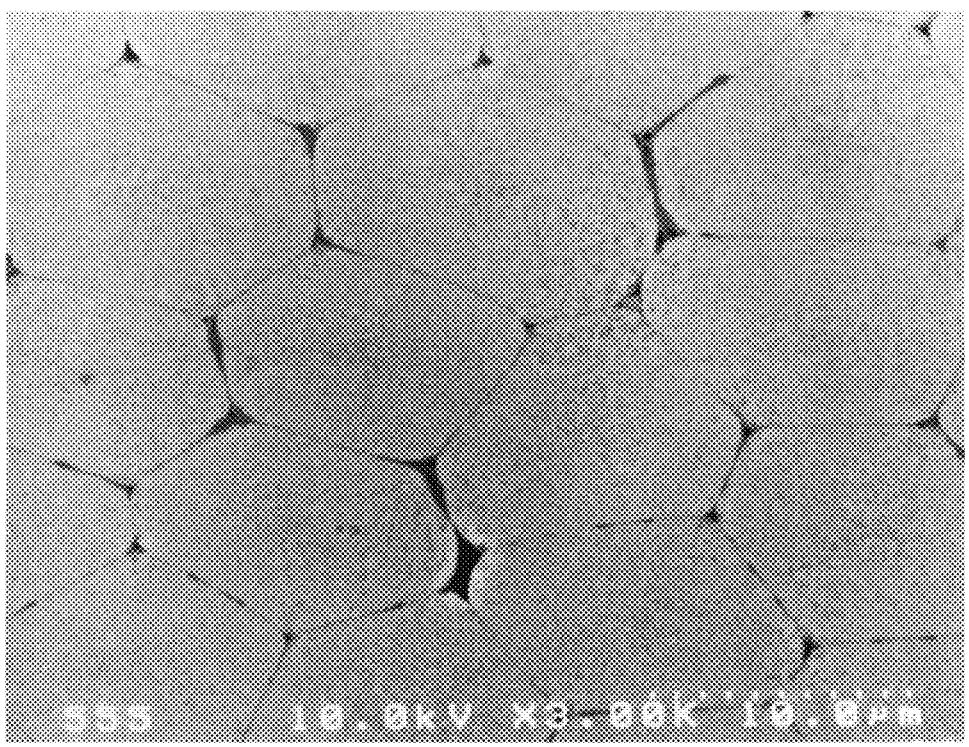
FIG. 1 is an micrograph showing a crystal structure of a sintered SiC fiber-bonded material obtained in Example 1.

First, the sintered SiC fiber-bonded material of the present invention will be explained below.

A fiber material constituting the sintered SiC fiber-bonded material of the present invention is composed mainly of a sintered structure of a SiC crystal. In a well sintered region, a strong interfacial strength is exhibited between SiC crystals, and a fracture proceeds within crystal grains of SiC. When the fractured surface of the fiber material constituting the sintered SiC fiber-bonded material of the present invention is observed, the transcrystalline fracture behaviour is observed in at least 30% of the cross-sectional area of a fiber material.

In the fracture surface of the above fiber material, a well sintered region confirmed by a transcrystalline fracture behaviour and a transcrystalline fracture region are co-present in some cases, and a region containing 10% or less of pore is present in some cases as well.

The above fiber material contains at least one kind of metal atoms selected from metal atoms of the 2A, 3A and 3B groups of the periodic table.

The amount ratio of elements constituting the fiber material is generally as follows. The amount of Si is 55 to 70% by weight, the amount of C is 30 to 45% by weight, and the amount of M (metal element(s) of the 2A, 3A and 3B groups) is 0.05 to 4.0% by weight, preferably 0.1 to 2.0% by weight.

Particularly preferably, the metal element which is selected from the metal atoms of the 2A, 3A and 3B groups includes Be, Mg, Y, Ce, B and Al. These metal elements are all known as sintering aids, and they are present in the form of chelate compounds or alkoxide compounds capable of reacting with Si—H bonds of an organosilicon polymer. When the amount of the above metal is extremely small, it is difficult to attain the sufficient sintering properties of the fiber material. When it is extremely large, an intercrystalline fractures take place in many places, which results in a decrease in mechanical properties.

All or almost all of the fibers (fiber material) constituting the sintered SiC fiber bonded material of the present invention are deformed to have cross-sectionally polygonal forms and are filled nearly in the closest packing state. Further, a 1 to 50 nm thick boundary layer composed mainly of carbon is formed at the interface of each fiber, and when a fracture takes place, the interfacial carbon layer plays a role as a slippage layer and then results in high fracture energy of the sintered SiC fiber-bonded material, i.e., unbreakability.

As a reflection of the above structure, the sintered SiC fiber bonded material of the present invention exhibits remarkably excellent high-temperature mechanical properties that its strength at 1,600° C. is at least 80% of its strength at room temperature.

The fiber material constituting the sintered SiC fiber-bonded material of the present invention can have any one of an aligned state similar to a laminated state of a unidirectionally arranged sheet-like substance, an aligned state similar to a laminated state of two-dimensional fabrics, an aligned state similar to a state of a three-dimensional fabric or a random-alignment state, or it can have a composite structure of these. A selection is properly made from these depending upon mechanical properties required of an article as an end product.

The process for the production of the sintered SiC fiber bonded material, provided by the present invention, will be explained hereinafter.

The present invention proposes two production processes which are different in the method of conversion to an inorganic material.

The first process comprises:
a first step of adding a compound containing at least one kind of metal atoms selected from the class consisting of the 2A, 3A and 3B groups of the periodic table to a polysilane in which the molar ratio of carbon atoms to silicon atoms is at least 1.5 or a heat reaction product thereof and allowing the resultant mixture to react under heat in an inert gas atmosphere, to prepare a metal-element-containing organosilicon polymer, a second step of melt-spinning the metal-element-containing organosilicon polymer to obtain a spun fiber, a third step of curing the spun fiber under heat at 50 to 170° C. in an oxygen-containing gas atmosphere to prepare an infusible fiber, a fourth step of converting the infusible fiber to inorganic fibers in an inert gas atmosphere, and a fifth step of preparing a preliminary shaped material from the inorganic fibers, setting the preliminary shaped material in a mold, and pressurizing the preliminary shaped material in the mold at a temperature in the range of from 1,700 to 2,200° C. in vacuum or in a gas atmosphere containing at least one selected from the group consisting of an inert gas, a reducing gas and hydrocarbon gas.

First step

In the first step, there is prepared a metal-containing organic polymer which is a precursor polymer.

The polysilane is a linear or cyclic polymer obtained by dechlorination of at least one dichlorosilane with sodium according, for example, to the method described in "Chemistry of Organosilicon Compound" Kagaku Dojin (1972). The polysilane generally has a number average molecular weight of 300 to 1,000. The polysilane used in the present invention may have a hydrogen atom, a lower alkyl group, an aryl group, a phenyl group or a silyl group as a side chain bonding to silicon. In any case, the molar ratio of carbon atoms to silicon atoms is required to be at least 1.5. When this requirement is not satisfied, all the carbon atoms of the fiber are eliminated in the form of CO gas together with oxygen atoms introduced for the infusibilization in the process of increasing a temperature before sintering is completed, and undesirably, no inter-facial carbon layer is formed.

The polysilane used in the present invention includes an organosilicon polymer which partly contains carbosilane bonds in addition to polysilane bond units, obtained by heating the above linear or cyclic polysilane. The above organosilicon polymer can be prepared by a known method, which includes a method of allowing the linear or cyclic polysilane to react under heat at a relatively high temperature of 400 to 700° C. and a method of adding a phenyl-group-containing polyborosiloxane to the above polysilane and allowing the mixture to react under heat at a relatively low temperature of 250 to 500° C. The so-obtained organosilicon polymer generally has a number average molecular weight of 1,000 to 5,000.

The above phenyl-group-containing polyborosiloxane can be prepared according to the method described in JP-A-53-42300 and JP-A-53-50299. For example, the phenyl-group-containing polyborosiloxane can be prepared by dechlorinating condensation of boric acid and at least one diorganochlorosilane, and it generally has a number average molecular weight of 500 to 10,000. The amount of the phenyl-group-containing polyborosilane to be added per 100 parts by weight of the polysilane is generally 15 parts by weight or less.

A predetermined amount of a compound containing at least one kind of metal element selected from the class consisting of the 2A, 3A and 3B groups of the periodic table is added to the polysilane, and the mixture is allowed to react in an inert gas generally at a temperature in the range of from 250° C. to 350° C. for 1 to 10 hours, whereby the metalelement-containing organosilicon compound as a raw material can be prepared. The above metal element is used in such a proportion that the content thereof in the sintered SiC fiber-bonded material to be finally obtained is 0.05 to 4.0% by weight. The specific proportion can be determined by one skilled in the art according to the teaching of the present specification.

The above metal-element-containing organosilicon compound is a crosslinked polymer having a structure in which at least some silicon atoms of the polysilane bond to metal atoms through an oxygen atom each or through no oxygen atom.

The compound containing at least one kind of metal element selected from the class consisting of the 2A, 3A and 3B groups, added in the first step, can be selected from alkoxides, acetylalkoxide compounds, carbonyl compounds and cyclopentadienyl compounds of the above metal elements, such as beryllium acetylacetonate, magnesium acetylacetonate, yttrium acetylacetonate, cerium acetylacetonate, boric acid butoxide, aluminum acetylacetonate.

The above compounds are all capable of reacting with Si—H bonds of an organosilicon polymer formed during their reaction with the polysilane or its heat reaction product, to form a structure in which metal elements thereof bond to Si atoms directly or through other element Second step In the second step, spun fibers of a metal-element-containing organosilicon polymer are obtained.

The metal-element-containing organosilicon polymer as a precursor polymer is spun by a known method such as a melt-spinning method or a dry spinning method, to obtain a spun fiber.

Third step

In the third step, the spun fiber is cured under heat at 50 to 170° C. in an oxygen-containing atmosphere, to prepare an infusible fiber.

The curing is carried out for the purpose of forming crosslinking points of oxygen atoms between polymers constituting the spun fiber so that the infusible fiber is not melted and that adjacent fibers are not fused to each other in the step of conversion of the infusible fiber to an inorganic fiber, which step is carried out later.

The gas for constituting the oxygen-containing atmosphere is selected from air, oxygen or ozone. The temperature for the curing is 50 to 170° C., and although depending upon the curing temperature, the time period for the curing is generally from several minutes to 30 hours.

The content of oxygen in the cured fiber is preferably controlled to be 8 to 16% by weight. Most part of the oxygen remains in the fiber after the step of conversion to an inorganic fiber, which step is carried out later, and it has an essential function, i.e., works to eliminate excess carbon in the inorganic fiber as CO gas in a temperature-increasing process before a final sintering is completed.

When the above oxygen content is less than 8% by weight, excess carbon in the inorganic fiber remains more than necessary, segregates around an SiC crystal in the temperature-increasing process to stabilize itself and therefore hampers the sintering of SiC. When the above oxygen content is greater than 16% by weight, excess carbon in the organic fiber is completely eliminated, and no interfacial carbon layer is formed. Both of these results cause detrimental effects on mechanical properties of the obtained material.

The above infusible fiber is preferably subjected further to preliminary heating in an inert atmosphere. The gas for constituting the inert atmosphere is selected from nitrogen, argon or the like. The heating temperature is generally 150 to 800° C., and the time period for the heating is several minutes to 20 hours. The preliminary heating of the infusible fiber in an inert atmosphere serves to proceed with the crosslinking reaction of the polymer constituting the fiber with preventing the inclusion of oxygen in the fiber and serves to more improve the cured fiber in strength with retaining the excellent extensibility of the infusible fiber from the precursor metal polymer.

Fourth step

In the fourth step, the infusible fiber is converted to an inorganic fiber by treating the infusible fiber under heat at a temperature of from 1,000° C. to 1,700° C. in an atmosphere containing an inert gas such as argon by a continuous method or a batch method.

Fifth step

In the fifth step, first, the inorganic fiber is formed into to a sheet-shaped material, a fabric-shaped material or a chopped material, and a preliminary shaped material formed of at least one of these is prepared. Then, the preliminary shaped material is set in a mold and pressurized at a temperature in the range of from 1,700° C. to 2,200° C. in vacuum or in an atmosphere containing at least one selected from the group consisting of an inert gas, a reducing gas and hydrocarbon.

In the process of increasing a temperature before the pressurization in the fifth step, the temperature elevation rate may be adjusted to a temperature within some temperature range, or the preliminary shaped material may be maintained at a certain temperature for a certain period of time, for effectively causing the above elimination of CO. Further, a pressurizing program matching the elimination rate of CO may be incorporated.

The other process for the production of a sintered SiC fiber bonded material is basically the same as the above production process except that the infusible fiber is set in a pressurizing mold and also converted to an inorganic material in the mold.

EXAMPLES

The present invention will be explained more in detail with reference to Examples and Comparative Example hereinafter.

Referential Example 1

While 400 g of anhydrous xylene was refluxed under heat under the current of nitrogen gas, 1 liter of dimethyldichlorosilane was dropwise added to the xylene, and then, the mixture was refluxed under heat for 10 hours to form a precipitate. The precipitate was recovered by filtration and washed with methanol and then with water to give 420 g of a white polydimethylsilane.

Referential Example 2

750 Grams of diphenyldichlorosilane and 124 g of boric acid were heated at 100 to 120° C. in n-butyl ether in a nitrogen gas atmosphere, and a formed while resinous material was further heated at 400° C. for 1 hour to give 530 g of a phenyl-group-containing polyborosiloxane.

Example 1

4 Parts of the phenyl-group-containing polyborosiloxane obtained in Referential Example 2 was added to 100 parts of the polydimethylsilane obtained in Referential Example 1, and the mixture was allowed to undergo thermal condensation at 350° C. for 5 hours in a nitrogen gas atmosphere to obtain an organosilicon polymer having a high molecular weight. 7 Parts of aluminum-tri-(sec-butoxide) was added to a solution of 100 parts of the above organosilicon polymer in xylene, and the mixture was allowed to undergo a crosslinking reaction at 310° C. under the current of nitrogen gas, to synthesize a polyaluminocarbosilane.

The above polyaluminocarbosilane was melt-spun at 245° C., and the spun fiber was heat-treated in air at 140° C. for 5 hours and, further, heated in nitrogen at 300° C. for 10 hours to obtain an infusible fiber.

The above infusible fiber was continuously fired in nitrogen at 1,500° C. to synthesize a silicon-carbide-containing continuous inorganic fiber. The obtained continuous inorganic fiber was shaped into a unidirectionally aligned sheet-like material, and a laminate was prepared from the above sheet-like material such that each of laminate-forming layers had the same fiber direction. The laminate was set in a mold made of carbon and temperature-increased up to 2,000° C. under a pressure of 50 MPa, to give a sintered SiC fiber-bonded material.

The obtained sintered SiC fiber bonded material had a chemical composition of Si: 67% by weight, C: 31% by weight, O: 0.3% by weight, Al: 0.8% by weight and B: 0.06% by weight and an Si:C:O:Al atomic ratio of 1:1.08:0.008:0.012. The fiber material thereof was deformed in a polygonal form each and packed in the closest packing state as shown FIG. 1, and interfacial carbon layers having an average thickness of about 10 nm were formed. The sintered SiC fiber-bonded material had a density of 2.95 g/cm$^3$, a four-point bending strength, measured at room temperature, of 550 MPa, an elastic modulus, measured at room temperature, of 340 GPa and exhibited a composite-like fracture behaviour. Further, the sintered SiC fiber-bonded material showed a four-point bending strength, measured at 1,600° C., of 570 MPa or showed no decrease in strength.

Example 2

The polydimethylsilane obtained in Referential Example 1 was subjected to thermal condensation at 470° C. for 6 hours to obtain an organosilicon polymer having a high molecular weight. 7 Parts of aluminum-tri-(sec-butoxide) was added to a solution of 100 parts of the organosilicon polymer in xylene, and the mixture was subjected to a crosslinking reaction under the current of nitrogen gas at 320° C. to synthesize a polyaluminocarbosilane.

The above polyaluminocarbosilane was melt-spun at 255° C., and the spun fiber was heat-treated at 170° C. for 10 hours and further heated in nitrogen at 320° C. for 9 hours to obtain an infusible fiber. The infusible fiber was processed into a unidirectionally aligned sheet-like material, and the sheet-like material was set in a mold made of carbon, temperature-increased up to 1,300° C. under reduced pressure and maintained for 1 hour. Then, an argon gas was introduced, and the sheet-like material was temperature-increased to 1,800° C. and then pressurized to 50 MPa to prepare a sintered SiC fiber-bonded material. The sintered SiC fiber-bonded material had a density of 3.05 g/cm$^3$, a four-point bending strength, measured at room temperature, of 580 MPa and an elastic modulus, measured at room temperature, of 330 GPa and exhibited a fracture form like that of a composite material. Further, the sintered SiC fiber-bonded material showed a four-point bending strength, measured at 1,600° C., of 565 MPa or retained 97% of its initial strength.

Comparative Example 1

20 Parts of the phenyl-group-containing polyborosiloxane obtained in Referential Example 2 was added to 100 parts of the polydimethylsilane obtained in Referential Example 1, and the mixture was subjected to thermal condensation in a nitrogen gas atmosphere at 350° C. for 10 hours, to obtain a polycarbosilane having a high molecular weight. The polycarbosilane was melt-spun at 232° C. and heat-treated in air at 160° C. for 9 hours to obtain an infusible fiber. The infusible fiber was continuously fired in nitrogen at 1,500° C. to synthesize a silicon-carbide-containing continuous inorganic fiber. A fiber-bonded material was prepared from the continuous inorganic fiber in the same manner as in Example 1. The fiber-bonded material had a small density, as small as 2.56 g/cm$^3$, no transcrystalline fracture behaviour was found, and it had a low strength, measured at room temperature, of 200 MPa and a low elastic modulus, measured at room temperature, of 180 GPa.

Example 3

A modified polycarbosilane having aluminum and magnesium introduced was obtained in the same manner as in Example 1 except that 7 parts of the aluminum-tri(sec-butoxide) was replaced with 4 parts of aluminum-tri(sec-butoxide) and 3 parts of magnesium acetylacetonate and that the crosslinking reaction was carried out in the current of nitrogen gas at 310° C.

The above modified carbosilane was melt-spun at 255° C., and then the spun fiber was heat-treated in air at 150° C. for 3 hours and further heated in nitrogen at 300° C. for 9 hours to obtain an infusible fiber. The infusible fiber was continuously fired in argon at 1,450° C., to synthesize an amorphous silicon carbide fiber. The amorphous silicon carbide fiber had a chemical composition of Si: 53% by weight, C: 33.4% by weight, O: 13% by weight, Al: 0.34% by weight, B: 0.01% by weight and Mg: 0.30% by weight.

The above amorphous silicon carbide fiber was shaped into a unidirectionally aligned sheet-like material, and a laminate was prepared from the above sheet-like material such that each of laminate-forming layers had the same fiber direction. The laminate was set in a mold made of carbon and temperature-increased up to 1,600° C. in a hot press apparatus in which argon had been substituted, and the laminate was temperature-increased up to 1,800° C. under a pressure of 40 MPa to prepare a sintered SiC fiber-bonded material.

The obtained sintered SiC fiber-bonded material had a chemical composition of Si: 67.5% by weight, C: 31% by weight, O: 0.3% by weight, Al: 0.74% by weight, B: 0.06% by weight and Mg: 0.4% by weight and an Si:C:O:Al atomic ratio of 1:1.07:0.0078:0.0114. The fiber material thereof was deformed from a round columnar shape to a polygonal columnar shape and packed in the closest packing state, and interfacial carbon layers having an average thickness of about 15 nm were formed. The sintered SiC fiber-bonded material had a density of 3.05 g/cm$^3$, a four-point bending strength, measured at room temperature, of 530 MPa and an elastic modulus, measured at room temperature, of 295 GPa and exhibited a fracture form characteristic of a composite material. Further, the sintered SiC fiber-bonded material retained the above room temperature strength at 1,600° C. as well.

Example 4

A modified polycarbosilane having aluminum and yttrium introduced was obtained in the same manner as in Example 1 except that 7 parts of the aluminum-tri(sec-butoxide) was replaced with 4 parts of aluminum-tri(sec-butoxide) and 3 parts of yttrium acetylacetonate and that the crosslinking reaction was carried out in the current of nitrogen gas at 300° C.

The above modified carbosilane was melt-spun at 265° C., and then the spun fiber was heat-treated in air at 150° C. for 3 hours and further heated in nitrogen at 300° C. for 10 hours to obtain an infusible fiber. The infusible fiber was continuously fired in argon at 1,450° C., to synthesize an amorphous silicon carbide fiber. The amorphous silicon carbide fiber had a chemical composition of Si: 52.5% by weight, C: 34.5% by weight, O: 12% by weight, Al: 0.35% by weight, B: 0.005% by weight and Y: 0.56% by weight.

The above amorphous silicon carbide fiber was shaped into a unidirectionally aligned sheet-like material, and a laminate was prepared from the above sheet-like material such that each of laminate-forming layers had the same fiber direction. The laminate was set in a mold made of carbon and temperature-increased up to 1,650° C. in a hot press apparatus in which argon had been substituted, and the laminate was temperature-increased up to 1,900° C. under a pressure of 50 MPa to prepare a sintered SiC fiber bonded material.

The obtained sintered SiC fiber-bonded material had a chemical composition of Si: 67.87% by weight, C: 31% by weight, O: 0.3% by weight, Al: 0.5% by weight, B: 0.03% by weight and Y: 0.3% by weight and an Si:C:O:Al atomic ratio of 1:1.07:0.0077:0.0076. The fiber material thereof was deformed from a round columnar shape to a polygonal columnar shape and packed in the closest packing state, and interfacial carbon layers having an average thickness of about 13 nm were formed. The sintered SiC fiber bonded material had a density of 2.95 g/cm$^3$, a four-point bending strength, measured at room temperature, of 570 MPa and an elastic modulus, measured at room temperature, of 305 GPa and exhibited a composite-like fracture behaviour. Further, the sintered SiC fiber bonded material retained the above room temperature strength at 1,600° C. as well.

What is claimed is:

1. A less breakable highly heat-resistant sintered SiC fiber-bonded material comprising inorganic fibers which are composed mainly of a sintered SiC crystal, contain at least one kind of metal atoms selected from the group consisting of metal atoms of the 2A, 3A and 3B groups of the periodic table in a structure in which metal atoms are bonded to Si atoms directly or other elements and are bonded nearly in the closest packing state and 1 to 50 nm boundary layers composed mainly of carbon which are present at the interface of fibers, the less breakable highly heat-resistant sintered SiC fiber-bonded material having a density of at least 2.7 g/cm$^3$ and an elastic modulus of at least 200 GPa.

2. The sintered SiC fiber-bonded material according to claim 1, wherein the sintered SiC fiber-bonded material measured at 1,600° C. has at least 80% of the strength obtained by measurement thereof at room temperature.

3. The sintered SiC fiber-bonded material according to claim 1, wherein the all or most of the inorganic fibers are deformed from a round columnar shape to a polygonal columnar shape and exhibit a close-packed structure.

4. The sintered SiC fiber-bonded material according to claim 1, wherein the inorganic fibers are in at least one aligned state selected from the group consisting of a laminated state of a unidirectionally arranged sheet-like substance, a laminated state of two-dimensional fabrics, a state of a three-dimensional fabric and a state of a random-alignment.

* * * * *